(12) United States Patent
    Blocksome

(10) Patent No.: US 9,158,718 B2
(45) Date of Patent: *Oct. 13, 2015

(54) DETERMINISTIC MESSAGE PROCESSING IN A DIRECT MEMORY ACCESS ADAPTER

(71) Applicant: International Business Machines Corporation, Armonk, NY (US)

(72) Inventor: Michael A. Blocksome, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/148,975

(22) Filed: Jan. 7, 2014

(65) Prior Publication Data
    US 2015/0193364 A1    Jul. 9, 2015

(51) Int. Cl.
    *G06F 13/30*    (2006.01)
(52) U.S. Cl.
    CPC ..................................... *G06F 13/30* (2013.01)
(58) Field of Classification Search
    CPC ....................................................... G06F 13/30
    See application file for complete search history.

(56) References Cited

U.S. PATENT DOCUMENTS

| 6,212,567 | B1 | 4/2001 | Thomas et al. |
| 7,133,943 | B2 | 11/2006 | Carnevale et al. |
| 8,018,951 | B2 | 9/2011 | Blocksome |
| 8,266,338 | B2 | 9/2012 | Go et al. |
| 8,527,672 | B2 | 9/2013 | Blocksome et al. |
| 8,528,004 | B2 | 9/2013 | Archer et al. |
| 2005/0262515 | A1* | 11/2005 | Dinh et al. ..................... 719/314 |
| 2010/0082848 | A1 | 4/2010 | Blocksome et al. |
| 2012/0265835 | A1 | 10/2012 | Archer et al. |
| 2013/0097263 | A1 | 4/2013 | Blocksome et al. |

* cited by examiner

*Primary Examiner* — Idriss N Alrobaye
*Assistant Examiner* — Ronald Modo
(74) *Attorney, Agent, or Firm* — Edward J. Lenart; James R. Nock; Kennedy Lenart Spraggins LLP (57) ABSTRACT

Deterministic message processing in a direct memory access (DMA) adapter includes the DMA adapter incrementing from a sub-head pointer, a sub-tail pointer until encountering an out-of-sequence packet. The DMA adapter also consumes packets between the sub-head pointer and the sub-tail pointer including incrementing with the consumption of each packet, the sub-head pointer until determining that the sub-head pointer is equal to the sub-tail pointer. In response to determining that the sub-head pointer is equal to the sub-tail pointer, the DMA adapter determines whether the head pointer is pointing to the next in-sequence packet. If the head pointer is pointing to the next in-sequence packet, the DMA adapter resets the sub-head pointer and the sub-tail pointer to the head pointer. If the head pointer is not pointing to the next in-sequence packet, the DMA adapter resets the sub-head pointer and the sub-tail pointer to the next in-sequence packet.

12 Claims, 6 Drawing Sheets

DETERMINISTIC MESSAGE PROCESSING IN A DIRECT MEMORY ACCESS ADAPTER

BACKGROUND OF THE INVENTION

1. Field of the Invention

The field of the invention is data processing, or, more specifically, methods, apparatuses, and computer program products for deterministic message processing in a direct memory access adapter.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Data communications is an area of computer technology that has experienced advances, and modes of data communications today effectively implement distributed computing environments. In the 1990s, a consortium that included Apollo Computer (later part of Hewlett-Packard), IBM, Digital Equipment Corporation, and others developed a software system that was named 'Distributed Computing Environment.' That software system is mentioned here for the sake of clarity to explain that the term 'distributed computing environment' as used in this specification does not refer that software product from the 1990s. As the term is used here, 'distributed computing environment' refers to any aggregation of computers or compute nodes coupled for data communications through a system-level messaging layer in their communications protocol stacks, where the system-level messaging layer provides 'active' messaging, messaging with callback functions. Implementations of such system-level messaging include messaging layers in client-server architectures, messaging layers in Symmetric Multi-Processing ('SMP') architectures with Non-Uniform Memory Access ('NUMA'), and messaging layers in parallel computers, including Beowulf clusters and even supercomputers with many compute node coupled for data communications through such system-level messaging. Common implementations of system-level messaging for parallel processing include the well known Message Passing Interface ('MPI') and the Parallel Virtual Machine ('PVM'). Both of these permit the programmer to divide a task among a group of networked computers, and collect the results of processing. Examples of MPI implementations include OpenMPI and MPICH. These and others represent examples of implementations of system-level messaging that can be improved for deterministic message processing in a direct memory access (DMA) adapter according to embodiments of the present invention.

Parallel computing is another area of computer technology that has experienced advances. Parallel computing is the simultaneous execution of the same application (split up and specially adapted) on multiple processors in order to obtain results faster. Parallel computing is based on the fact that the process of solving a problem often can be divided into smaller jobs, which may be carried out simultaneously with some coordination. Parallel computing expands the demands on middleware messaging beyond that of other architectures because parallel computing includes collective operations, operations that are defined only across multiple compute nodes in a parallel computer, operations that require, particularly in supercomputers, massive messaging at very high speeds. Examples of such collective operations include BROADCAST, SCATTER, GATHER, AND REDUCE operations.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In a tree network, the nodes typically are connected into a binary tree: each node has a parent and two children (although some nodes may only have zero children or one child, depending on the hardware configuration). In computers that use a torus and a tree network, the two networks typically are implemented independently of one another, with separate routing circuits, separate physical links, and separate message buffers.

A torus network lends itself to point to point operations, but a tree network typically is inefficient in point to point communication. A tree network, however, does provide high bandwidth and low latency for certain collective operations, message passing operations where all compute nodes participate simultaneously, such as, for example, an allgather.

There is at this time a general trend in computer processor development to move from multi-core to many-core processors: from dual-, tri-, quad-, hexa-, octo-core chips to ones with tens or even hundreds of cores. In addition, multi-core chips mixed with simultaneous multithreading, memory-on-chip, and special-purpose heterogeneous cores promise further performance and efficiency gains, especially in processing multimedia, recognition and networking applications. This trend is impacting the supercomputing world as well, where large transistor count chips are more efficiently used by replicating cores, rather than building chips that are very fast but very inefficient in terms of power utilization.

In a distributed system, nodes are transmitting packets of data between to each other as part of parallel processing of tasks. As the number of nodes and processors in the system grows, so too does the amount of message traffic. Managing delivery and processing of the message traffic is important to the overall efficiency of the operation of the system.

SUMMARY OF THE INVENTION

Deterministic message processing in a direct memory access (DMA) adapter includes the DMA adapter incrementing from a sub-head pointer, a sub-tail pointer until encountering an out-of-sequence packet. The DMA adapter also consumes packets between the sub-head pointer and the sub-tail pointer including incrementing with the consumption of each packet, the sub-head pointer until determining that the sub-head pointer is equal to the sub-tail pointer. In response to determining that the sub-head pointer is equal to the sub-tail pointer, the DMA adapter determines whether the head pointer is pointing to the next in-sequence packet. If the head pointer is pointing to the next in-sequence packet, the DMA adapter resets the sub-head pointer and the sub-tail pointer to the head pointer. If the head pointer is not pointing to the next in-sequence packet, the DMA adapter resets the sub-head pointer and the sub-tail pointer to the next in-sequence packet.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
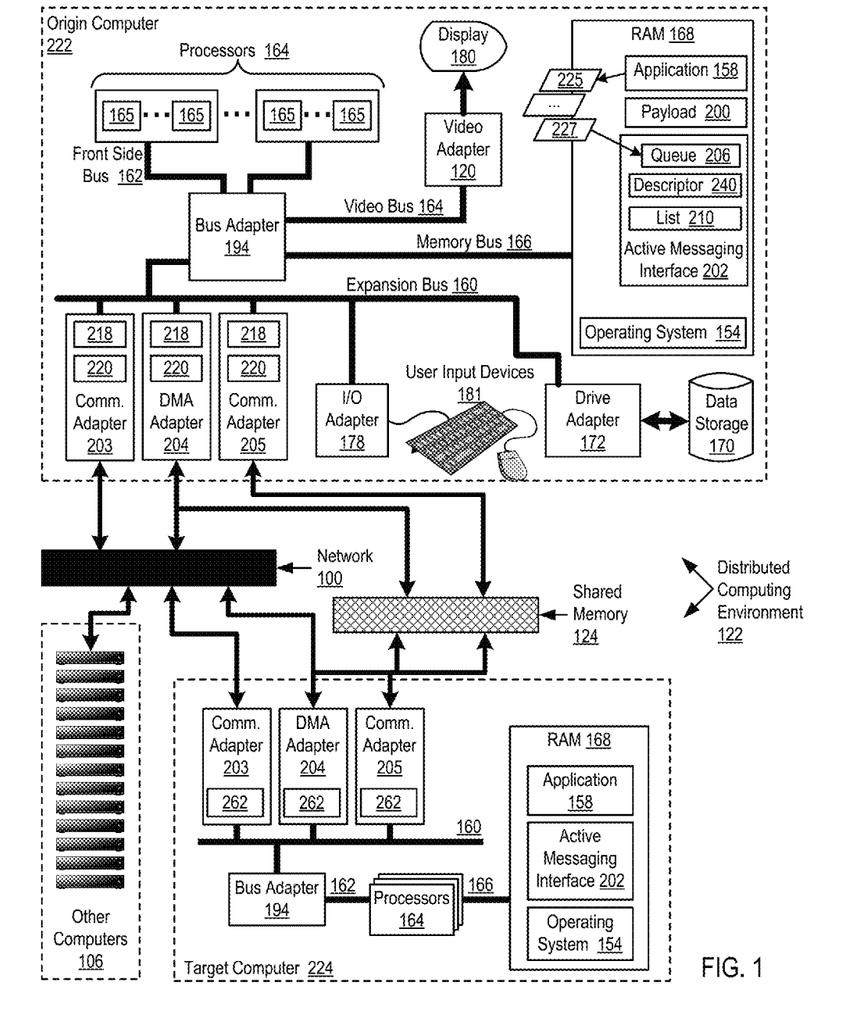
FIG. 1 sets forth a functional block diagram of an example distributed computing environment that performs deterministic message processing according to embodiments of the present invention.

Example methods, apparatuses, and computer program products for deterministic message processing in a direct memory access (DMA) adapter according to embodiments of the present invention are described with reference to the accompanying drawings, beginning with FIG. 1. FIG. 1 sets forth a functional block diagram of an example distributed computing environment (122) that performs deterministic message processing according to embodiments of the present invention. The distributed computing environment (122) of FIG. 1 includes several computers, an origin computer (222), a target computer (224), and other computers (106), all of which are coupled for data communications through communications adapters (203, 204, 205) and an active messaging interface ('AMI') (202). For ease of illustration, only the origin computer (222) and the target computer (224) are illustrated in detail with the communications adapters (203, 204, 205) and the AMI (202), but the other computers (106) also are so equipped. From time to time in this specification, an origin compute node may also be referred to as a 'sender' and a target compute node may also be referred to as a 'receiver.'

The origin and target computers (222, 224) in the example of FIG. 1 include one or more computer processors (164) or 'CPUs' as well as random access memory (168) ('RAM'). Each processor (164) can support multiple hardware compute cores (165), and each such core can in turn support multiple threads of execution, hardware threads of execution as well as software threads. Each processor (164) is connected to RAM (168) through a high-speed memory bus (166)—and through a high-speed front side bus (162), a bus adapter (194), and an expansion bus (160) to other components of the computer. Stored in RAM (168) is an application program (158), a module of computer program instructions that carries out user-level data processing using linear, SMP, or parallel algorithms that include data communications among the computers in the distributed computing environment, including issuing data communications instructions to the AMI (202).

Also shown stored in RAM (168) is the AMI (202) itself, a module of automated computing machinery that carries out deterministic message processing according to embodiments of the present invention. An AMI (202) can be developed from scratch to carry out deterministic message processing according to embodiments of the present invention, using a traditional programming language such as the C programming language or C++, for example, and using traditional programming methods to write communications routines that send and receive data among computers in the distributed computing environment through data communications networks or shared-memory transfers. Such an AMI developed from scratch can expose to applications an entirely new application programming interface ('API'). As an alternative to an AMI developed from scratch, an AMI (202) can expose a traditional API, such as MPI's API, to the application (158) so that the application can gain the benefits of an AMI with no need to recode the application. As an alternative to development from scratch, however, existing prior art system-level messaging modules may be improved to carry out deterministic message processing according to embodiments of the present invention, existing modules that already implement a traditional interface. Examples of prior-art system-level messaging modules that can be improved to implement deterministic message processing in a direct memory access (DMA) adapter according to embodiments of the present invention include such parallel communications libraries as the traditional 'Message Passing Interface' ('MPI') library, the 'Parallel Virtual Machine' ('PVM') library, MPICH, and the like. In the example of FIG. 1, the AMI (202) is represented in RAM (168). Readers will recognize, however, that the representation of the AMI in RAM is a convention for ease of explanation rather than a limitation of the present invention, because the AMI in fact can be implemented partly as software or firmware and hardware—or even, at least in some embodiments, entirely in hardware.

Also stored in RAM (168) is an operating system (154). An operating system is a computer software component that is responsible for execution of applications programs and for administration of access to computer resources, memory, processor time, and I/O functions, on behalf of application programs. Operating systems useful for deterministic message processing according to embodiments of the present invention include UNIX™ Linux™ Microsoft XP™ AIX™ IBM's i5/OS™ and others as will occur to those of skill in the art. The application (168), the AMI (202), and the operating system (154) in the example of FIG. 1 are shown in RAM (168), but many components of such data processing modules typically are stored in non-volatile memory also, such as, for example, on a disk drive (170).

The origin computer (222) of FIG. 1 includes disk drive adapter (172) coupled through expansion bus (160) and bus adapter (194) to the processor (164) and other components of the computer (222). Disk drive adapter (172) connects non-volatile data storage to the computer (222) in the form of disk drive (170). Disk drive adapters useful in computers for deterministic message processing according to embodiments of the present invention include Integrated Drive Electronics ('IDE') adapters, Small Computer System Interface ('SCSI') adapters, and others as will occur to those of skill in the art. Non-volatile computer memory also may be implemented as an optical disk drive, electrically erasable programmable read-only memory (so-called 'EEPROM' or 'Flash' memory), RAM drives, and so on, as will occur to those of skill in the art.

The example origin computer (222) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (222) of FIG. 1 includes a video adapter (120), which is an example of an I/O adapter specially designed for graphic output to a display device (180) such as a display screen or computer monitor. Video adapter (120) is connected to processors (164) through a high speed video bus (164), bus adapter (194), and the front side bus (162), which is also a high speed bus.

The example target and origin computers (222, 224) of FIG. 1 include communications adapters (203, 204, 205) for data communications with other computers through a data communications network (100) or a segment of shared memory (124). Such data communications may be carried out serially through RS-232 connections, through external buses such as a Universal Serial Bus ('USB'), through data communications data communications networks such as Internet Protocol ('IP') data communications networks, and in other ways as will occur to those of skill in the art. Communications adapters implement the hardware level of data communications through which one computer sends data communications to another computer, directly, through shared memory, or through a data communications network. Examples of communications adapters useful for deterministic message processing according to embodiments of the present invention include modems for wired dial-up communications, Ethernet (IEEE 802.3) adapters for wired data communications network communications, and 802.11 adapters for wireless data communications network communications. In the particular example of FIG. 1, communications adapters (203, 204, 205) adapt computers for communications through a network (100). Examples of networks useful for deterministic message processing according to embodiments of the present invention include Infiniband™, Gigabit Ethernet™, Fibre Channel™, PCI Express™, Serial ATA™, and others.

The communications adapters in the example of FIG. 1 include direct memory access ('DMA') adapters (204), modules of automated computing machinery that implement, through communications with other DMA adapters on other computers direct memory access to and from memory on its own computer as well as memory on other computers. Direct memory access is a way of reading and writing to and from memory among computers with reduced operational burden on computer processors (164); a CPU initiates a DMA transfer, but the CPU does not execute the DMA transfer. A DMA transfer essentially copies a block of memory from one computer to another, or between RAM segments of applications on the same computer, from an origin to a target for a PUT operation, from a target to an origin for a GET operation, for example.

Also in the example of FIG. 1, communications adapters (205) adapt computers for communications through a segment of shared memory (124). In the example of FIG. 1, each processor or compute core has uniform access to the RAM (168) on the same computer, so that accessing a segment of shared memory is equally fast regardless where the shared segment is located in physical memory. In some embodiments, however, modules of physical memory are dedicated to particular processors, so that a processor may access local memory quickly and remote memory more slowly, a configuration referred to as a Non-Uniform Memory Access or 'NUMA.' In such embodiments, a segment of shared memory (124) can be configured locally for one endpoint and remotely for another endpoint—or remotely from both endpoints of a communication. In an embodiment, the origin computer (222) and the target computer (224) are both compute cores on the same compute node in a parallel computer, and, in that circumstance at least, a segment of shared memory (124) can be local to both the origin computer (222) and the target computer (224). From the perspective of an origin computer transmitting data through a segment of shared memory that is configured remotely with respect to the origin endpoint, transmitting data through the segment of shared memory will appear slower that if the segment of shared memory were configured locally with respect to the origin—or if the segment were local to both the origin and the target. The shared memory communications adapter (205) presents a similar interface to the AMI (202) as do the other adapters (203, 204), including availability of an injection FIFO buffer (218). In embodiments where communications through a shared memory segment is available, however, it will often be faster than other methods.

The origin computer (222) and the target computer (224) are so labeled in this example because the origin computer is described as executing data communications instructions and therefore originating data transfers and the target computer is described as a subject of data communications instructions. The origin/target distinction does not describe the direction of data flow. A DMA PUT instruction transfers data from the origin computer to the target computer; a DMA GET instruction transfers data in the opposite direction from the target to the origin. In addition, the description here of only one target and one origin is not a limitation. In processing collective BROADCAST as a data communications instruction, a root process on an origin computer can transfer data to a large plurality of targets, including, for example, all of the computers (222, 224, 106) in the distributed computing environment—including treating itself as one of the targets. Similarly, in a collective GATHER, origin processes on all the computers in the distributed computing environment can transfer data to a single root process on one origin computer. In client/server, SMP, peer-to-peer, and other architectures, multiple origin computers send and receive message data among multiple target computers through an AMI.

The origin computer (222) in the example of FIG. 1 functions generally to carry out deterministic message processing by receiving in the AMI (202) from an application (158) a sequence (225 . . . 227) of data communications instructions. In an embodiment, the application calls a function in an API that is exposed by the AMI to insert or post the instructions into an instruction queue in the AMI. In this way, the application's call to the API function is non-blocking. That is, the application is not required to block, spin, or otherwise wait for completion of the processing of the data communications instructions. The application inserts or posts an instruction into the queue, continues with other processing, and is informed of instruction completion by the AMI through a done callback.

Each instruction specifies a transfer of payload data (200) among computers in the distributed computing environment, and at least one of the instructions specifies a callback function. Examples of data communications instructions amendable to, or that can be improved to work with, data communications according to embodiments of the present invention include the following, as well as others that will occur to those of skill in the art:

- rendezvous network-based SEND instructions in which both origin and target endpoints communicate and participate in a data transfer, good for longer messages, typically composed of handshakes transferring header information followed by packet switched messaging or DMA operations to transfer payload data,
- eager network-based SEND instructions in which only the origin or root computer conducts a data transfer, merely informing the target that the transfer has occurred, and requiring no communications or other participation from the target,
- rendezvous SEND instructions with operations conducted, not through a network, but through shared memory, in which both the origin and target communicate and participate in a data transfer,
- eager SEND instructions conducted, not through a network, but through shared memory, in which only the origin or root conducts a data transfer, merely informing targets that the transfer has occurred, but requiring no communications or other participation from the targets,
- network-based DMA PUT instructions, useful for fast transfers of small messages, sometimes containing header data and payload data in a single transfer or packet—DMA algorithms also can be used as components of other instructions—as for example a SEND instruction that does an origin-target handshake and then conducts payload transfers with PUTs,
- DMA PUT instructions with transfers through shared memory, again useful for fast transfers of small messages, sometimes containing header data and payload data in a single transfer or packet—DMA instructions also can be used as components of other algorithms—as for example a SEND instruction that does an origin-target handshake through a segment of shared memory and then conducts payload transfers with PUTs,
- data communications instructions based on DMA GET operations, either networked or through shared memory, and
- data communications instructions that include eager or rendezvous RECEIVE operations, either with send-side matching of SENDs or with receive-side matching.

The term 'payload' distinguishes header data and the like in data communications. The payload data (200) is specified typically with a buffer memory address and a quantity. The location and quantity of payload data as well as any callback functions are provided by the application (158) as parameters of the data communications instructions (225 . . . 227). A 'callback function' is often referred to in this specification simply as a 'callback.' Callback functions include dispatch callbacks as well as done callbacks. A dispatch callback is a function to be called upon receipt of a data communications instruction. A done callback is a function to be called upon completion of the transfer of payload data as specified by a data communications instruction. Except as otherwise stated in context, discussion and description of a callback in this specification is a description of a done callback, so that the term 'callback' and 'done callback' are generally synonyms, unless otherwise stated.

The origin computer (222) in the example of FIG. 1 also injects, by the AMI (202) for each data communications instruction (225 . . . 227) into a slot in an injection FIFO buffer (218) of a data communication adapter (203, 204, 205), a transfer descriptor (240). The transfer descriptor specifies to the communications adapter the transfer of payload data, and the slot in the injection FIFO buffer (218) has a corresponding slot in a pending callback list (210). The term 'injection' connotes the 'injection' of transfer data into a data communications resource, a network, a shared memory, and the like, for actual transport to a target. A transfer descriptor provides a description of a data communications instruction that is recognizable or administrable by lower level data communications resources, including communications adapters, DMA adapters, and the like. The origin computer (222) also lists, through the AMI (202) in the corresponding slot in the pending callback list (210) for each data communications instruction, any callback function specified by that instruction and increments a pending callback counter (216) for each listed callback function.

The communications adapter (here, one of 203, 204, 205) that received the transfer descriptor transfers payload data in accordance with each transfer descriptor in its injection FIFO buffer (218) and increments a transfer counter (220) upon completion of each transfer. The origin computer (222) through its AMI also determines from counter values (216, 220) whether the pending callback list (210) presently includes callback functions for which transfers of payload data have been completed and calls through its AMI any callback functions in the pending callback list (210) for which transfers of payload data have been completed, decrementing the pending callback counter (216) for each callback function called.

The description set forth above regarding data communications describes lower-level or underlying steps that effect such data communications. The compute nodes in the example of FIG. 1 may also be configured to carry out data communications with one or more protocols. For example, a sender such as the origin compute node (222) of FIG. 1, may be configured to issue to a receiver, such as the target computer (224) of FIG. 1, an eager SEND data communications instruction to transfer SEND data, such as the payload (200) in the example of FIG. 1. The SEND instruction may be issued by the application as call to the AMI (202) as described above and may be processed through the AMI, data communications adapters (203, 204, 205) and the network (100) as described above. The SEND instruction may include information describing data location at the sender and data size.

The target computer (224), in dependence upon the data flow conditions, may then transfer from the origin computer's (222) data location to a receive buffer by remote direct memory access ("RDMA"), the SEND data. That is, the origin computer may initiate an eager send protocol for data communications and the target computer may change the protocol in dependence upon data flow conditions to an RDMA transfer.

Also depicted in the example of FIG. 1 is a first-in-first-out (FIFO) message queue (262) at each of the communication adapters (203, 204, 205) of the target computer (224). In such an embodiment, the target computer (224) may receive, from the origin computer (222), an eager SEND data communications instruction to transfer SEND data to the target computer (224), where the instruction includes information describing data location at the sender and data size. Then, the target computer (224) may receive the SEND data as data packets.

A communications adapter may utilize the FIFO message queue (262) for processing packets received by the communications adapter. The communications adapter may also utilize a head pointer, a tail pointer, a sub-head pointer, and a sub-tail pointer to point to particular packets within the FIFO message queue (262). Specifically, a communications adapter may utilize the head pointer, the tail pointer, the sub-head pointer, and the sub-tail pointer to perform deterministic message processing in accordance with the present invention.

The communications adapters may be configured to perform deterministic message processing by incrementing from the sub-head pointer, the sub-tail pointer until encountering an out-of-sequence packet and consuming packets between the sub-head pointer and the sub-tail pointer. According to embodiments of the present invention, consuming packets includes incrementing with the consumption of each packet, the sub-head pointer until determining that the sub-head pointer is equal to the sub-tail pointer. In response to determining that the sub-head pointer is equal to the sub-tail pointer, the communications adapter may determine whether the head pointer is pointing to the next in-sequence packet. If the head pointer is pointing to the next in-sequence packet, the communications adapter resets the sub-head pointer and the sub-tail pointer to the head pointer. If however, the head pointer is not pointing to the next in-sequence packet, the communications adapter resets the sub-head pointer and the sub-tail pointer to the next in-sequence packet.

The arrangement of computers, communications adapters, and other devices making up the example distributed computing environment illustrated in FIG. 1 are for explanation, not for limitation. Data processing systems useful for deterministic message processing according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
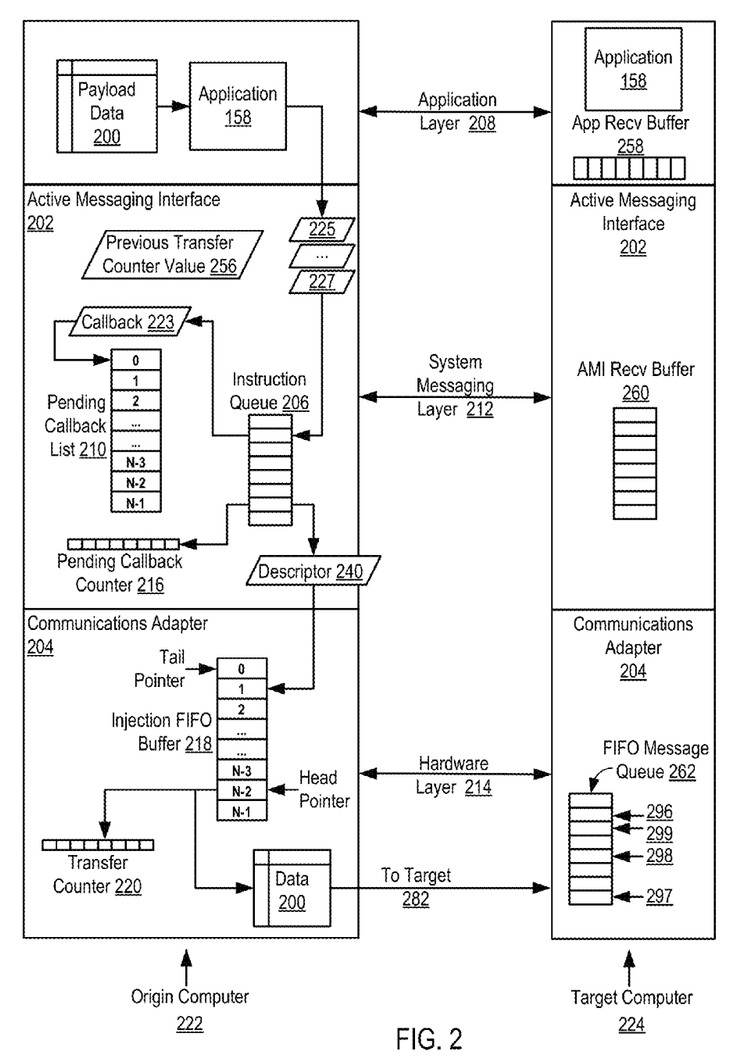
FIG. 2 sets forth a block diagram of an example protocol stack useful in an apparatus that performs deterministic message processing according to embodiments of the present invention.

For further explanation, FIG. 2 sets forth a block diagram of an example protocol stack useful in an apparatus that implements deterministic message processing in a direct memory access (DMA) adapter according to embodiments of the present invention. The example protocol stack of FIG. 2 includes a hardware layer (214), a system messaging layer (212), and an application layer (208). For ease of explanation, the protocol layers in the example stack of FIG. 2 are shown connecting an origin computer (222) and a target computer (224), although it is worthwhile to point out that in embodiments, the origin computer and the target computer can be the same computer, because any particular transfer can be from an origin application on a computer to a target application on the same computer. This pattern would be very common, for example, in a supercomputer whose compute nodes operate multi-threaded. Every thread of execution on such a computer can function as both an origin or a target for data transfers through an AMI, and both the origin and its target can be located on the same computer. So an origin computer (222) and its target computer (224) can in fact, and often will, be the same computer.

The application layer (208) provides communications among applications (158) running on the computers (222, 224) by invoking functions in an Active Messaging Interface ('AMI') (202) installed on each computer. Applications may communicate messages by invoking functions of an application programming interface ('API') exposed by the AMI (202). The AMI can expose a novel, custom API, or the AMI can expose a traditional API, such as, for example, an API of an MPI library, to applications (158) so that the application can gain the benefits of an AMI, reduced network traffic, callback functions, and so on, with little or no need to recode the application.

The example protocol stack of FIG. 2 includes a system messaging layer (212) implemented here as an Active Messaging Interface or 'AMI' (202). The AMI provides system-level data communications functions that support messaging in the application layer (208) and the system messaging layer (212). Such system-level functions are typically invoked through an API exposed to the application (158) in the application layer (208).

The protocol stack of FIG. 2 includes a hardware layer (214) that defines the physical implementation and the electrical implementation of aspects of the hardware on the computers such as the bus, network cabling, connector types, physical data rates, data transmission encoding and many other factors for communications between the computers (222, 224) on the physical network medium. In computers that implement deterministic message processing according to embodiments of the present invention, the hardware layer includes communications adapters, including DMA adapters, and network links, including routers, packet switches, and the like. In this particular example, the hardware layer (214) in each computer includes a communication adapter (204).

The origin computer (222) in the example of FIG. 2 functions generally to carry out deterministic message processing by receiving in the AMI (202) from an application (158) a sequence (225 . . . 227) of data communications instructions. In an embodiment, the application (158) calls a function in an API that is exposed by the AMI to insert or post the instructions into an instruction queue (206) in the AMI. In this way, the application's call to the API function is non-blocking. The application (158) does not block or spin on the post to the instruction queue. Instead, the application inserts or posts an instruction into the queue (206), continues with other processing, and is eventually informed of instruction completion by the AMI through a done callback. Each instruction (225 . . . 227) specifies a transfer of payload data (200) among computers in a distributed computing environment, and some of the data communications instructions specify callback functions (223).

The origin computer (222) in the example of FIG. 2 also injects, by the AMI (202) for each data communications instruction (225 . . . 227) into a slot in an injection FIFO buffer (218) of a data communication adapter (204), a transfer descriptor (240). 'FIFO' is an abbreviation of 'first-in-first-out' and connotes the fact that the communications adapter (204) processes its descriptors in the order in which they are placed in the injection FIFO buffer (218). The transfer descriptor (240) specifies to the communications adapter (204) the transfer of payload data, and the slot in the injection FIFO buffer (218) has a corresponding slot in a pending callback list (210). Both the injection FIFO buffer (218) and the pending callback list (210) are apportioned into N slots, here labeled 0 . . . N−1. The slots 'correspond' in that:

any pending callback for the transfer descriptor in slot 0 of the injection FIFO buffer (218) is found in slot 0 of the pending callback list (210)

any pending callback for the transfer descriptor in slot 1 of the injection FIFO buffer (218) is found in slot 1 of the pending callback list (210)

any pending callback for the transfer descriptor in slot N−2 of the injection FIFO buffer (218) is found in slot N−2 of the pending callback list (210), and any pending callback for the transfer descriptor in slot N−1 of the injection FIFO buffer (218) is found in slot N−1 of the pending callback list (210).

The term 'pending' as used here indicates that a callback has been listed but its corresponding data transfer has not yet been completed. Each done callback is called only after completion of its corresponding data transfer, the transfer represented by a transfer descriptor in a corresponding slot in the injection FIFO buffer.

The communications adapter (204) transfers payload data (200) in accordance with each transfer descriptor (240) in its injection FIFO buffer (218) and increments a transfer counter (220) upon completion of each transfer through its AMI any callback functions in the pending callback list (210) for which transfers of payload data have been completed as it does so.

Also depicted in the example of FIG. 2 is a FIFO message queue (262) at the target computer (224), an AMI receive buffer (260) allocated in AMI memory space of the target computer (224), and an application receive buffer (258) in application memory space of the target computer (224). The communications adapter (204) may utilize the FIFO message queue (262) for processing packets received by the communications adapter. The communications adapter may utilize a head pointer (296), a tail pointer (297), a sub-head pointer (299), and a sub-tail pointer (298) to point to particular packets within the FIFO message queue (262). Specifically, the communications adapter (204) may utilize the head pointer (296), the tail pointer (297), the sub-head pointer (299), and the sub-tail pointer (298) to perform deterministic message processing in accordance with the present invention.

The communications adapter (204) is configured to determine if there is space available in the FIFO message queue (262) and if space is available, insert received packets and their descriptors into the FIFO message queue (262) at the space indicated by the tail pointer (297). The communications adapter (204) also is configured to increment or (otherwise if there is a wrap in the FIFO) update the tail pointer (297). That is, the tail pointer (297) points to the 'tail' of the unprocessed portion of the FIFO message queue (262).

The communications adapter (204) is also configured to determine if packets above the head pointer (296) have been processed and if so, advance or increment the head pointer (296). That is, the head pointer (296) points to the 'head' of the unprocessed portion of the FIFO message queue (262).

In addition to the head pointer (296) and the tail pointer (297), the communications adapter (204) uses the sub-head pointer (299) and the sub-tail pointer (298) to point to a sub-sequence of packets that are in-order and between a sequence of packets between the head pointer (296) and the tail pointer (297). That is, the head pointer (296) and the tail pointer (297) identify a sequence of packets that may not be in order and the sub-head pointer (299) and the sub-tail pointer (298) identify a sub-sequence of packets that are within the sequence and are in-order. As will be explained in greater detail in FIG. 3, in a particular embodiment, the communications adapter has multiple threads, each of which may control different pointers of the FIFO message queue.

During operation, the communication adapter (204) may perform deterministic message processing by incrementing from the sub-head pointer (299), the sub-tail pointer (298) until encountering an out-of-sequence packet and consuming packets between the sub-head pointer (299) and the sub-tail pointer (298). An out-of-sequence packet is a packet that has an order number that does not consecutively follow the order number of the packet in the FIFO slot before the out-of-sequence packet.

According to embodiments of the present invention, consuming packets includes incrementing with the consumption of each packet, the sub-head pointer (299) until determining that the sub-head pointer (299) is equal to the sub-tail pointer (298). That is, the communications adapter has consumed all of the packets in the sub-sequence. In response to determining that the sub-head pointer (299) is equal to the sub-tail pointer (298), the communications adapter (204) may determine whether the head pointer (296) is pointing to the next in-sequence packet. A next in-sequence packet is the next packet that follows after the last packet in the sub-sequence. For example, if the order of the packets in the sub sequence is 1, 2, 3, 4, then the next in-sequence number would be 5.

If the head pointer (296) is pointing to the next in-sequence packet, the communications adapter (204) resets the sub-head pointer (299) and the sub-tail pointer (298) to the head pointer (296). If however, the head pointer (296) is not pointing to the next in-sequence packet, the communications adapter (204) resets the sub-head pointer (299) and the sub-tail pointer (298) to the next in-sequence packet.

Figure 3:
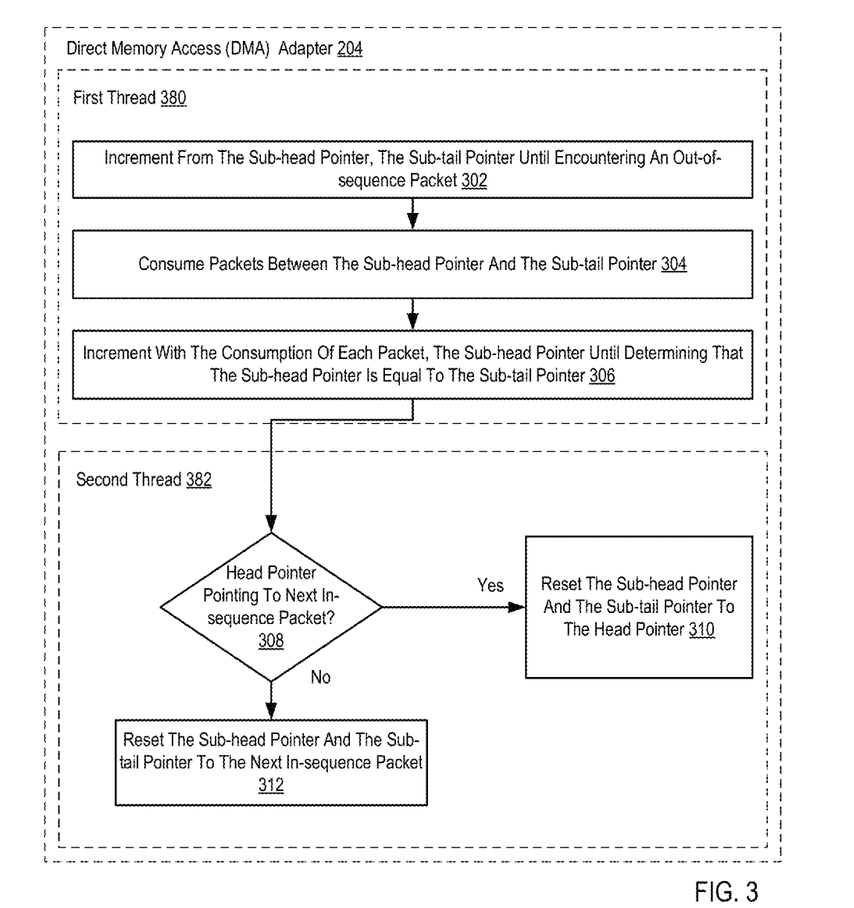
FIG. 3 sets forth a flow chart illustrating an example method of deterministic message processing in a direct memory access adapter according to embodiments of the present invention.

FIG. 3 sets forth a flow chart illustrating an example method of deterministic message processing in a direct memory access adapter according to embodiments of the present invention. The DMA adapter (204) of FIG. 3 utilizes a first-in-first-out (FIFO) message queue (262) for processing packets received by the DMA adapter. The DMA adapter (204) also uses a head pointer (296), a tail pointer (297), a sub-head pointer (299), and a sub-tail pointer (298) to point to particular packets within the FIFO message queue (218). The DMA adapter has a plurality of execution threads for processing the packets received by the DMA adapter including a first thread (380) and a second thread (382).

The communications adapter (204) is configured to determine if there is space available in the FIFO message queue (262) and if space is available, insert received packets and their descriptors into the FIFO message queue (262) at the space indicated by the tail pointer (297). The communications adapter (204) is also configured to increment or (otherwise if there is a wrap in the FIFO) update the tail pointer (297). That is, the tail pointer (297) points to the 'tail' of the unprocessed portion of the FIFO message queue (262).

The communications adapter (204) is also configured to determine if packets above the head pointer (296) have been processed and if so, advance or increment the head pointer (296). That is, the head pointer (296) points to the 'head' of the unprocessed portion of the FIFO message queue (262).

In addition to the head pointer (296) and the tail pointer (297), the communications adapter (204) uses the sub-head pointer (299) and the sub-tail pointer (298) to point to a sub-sequence of packets that are in-order and between the sequence of packets between the head pointer (296) and the tail pointer (297). That is, the head pointer (296) and the tail pointer (297) identify a sequence of packets that may not be in order and the sub-head pointer (299) and the sub-tail pointer (298) identify a sub-sequence of packets that are within the sequence and are in-order.

The method of FIG. 3 includes the first thread (380) incrementing (302) from the sub-head pointer (299), the sub-tail pointer (298) until encountering an out-of-sequence packet. An out-of-sequence packet is a packet that has an order number that does not consecutively follow the order number of the packet in the FIFO slot before the out-of-sequence packet. Incrementing (302) from the sub-head pointer (299), the sub-tail pointer (298) until encountering an out-of-sequence packet may be carried out by changing the value of the sub-head pointer and the value of the sub-tail pointer.

The method of FIG. 3 also includes the first thread (380) iteratively consuming (304) packets between the sub-head pointer (299) and the sub-tail pointer (298). Consuming (304) packets between the sub-head pointer (299) and the sub-tail pointer (298) includes incrementing (306) with the consumption of each packet, the sub-head pointer (299) until determining that the sub-head pointer (299) is equal to the sub-tail pointer (298). Incrementing (306) with the consumption of each packet, the sub-head pointer (299) until determining that the sub-head pointer (299) is equal to the sub-tail pointer (298) may be carried out by comparing the value of the sub-head pointer (299) to the value of the value of the sub-tail pointer (298) and changing the value of the sub-head pointer based on the comparison of the value of the sub-head pointer.

The method of FIG. 3 also includes the second thread (382) iteratively determining (308), in response to determining that the sub-head pointer (299) is equal to the sub-tail pointer (298), whether the head pointer (296) is pointing to the next in-sequence packet. Determining (308) whether the head pointer (296) is pointing to the next in-sequence packet may be carried out by comparing the value of the head pointer (296) to the value of the next in-sequence packet.

If the head pointer (296) is pointing to the next in-sequence packet, the method of FIG. 3 includes the second thread (382) resetting the sub-head pointer (299) and the sub-tail pointer (298) to the head pointer (296). Resetting the sub-head pointer (299) and the sub-tail pointer (298) to the head pointer (296) may be carried out by changing the value of the sub-head pointer and the value of the sub-tail pointer to match the value of the head pointer.

If the head pointer (296) is not pointing to the next in-sequence packet, the method of FIG. 3 includes the second thread (382) resetting the sub-head pointer (299) and the sub-tail pointer (298) to the next in-sequence packet. Resetting the sub-head pointer (299) and the sub-tail pointer (298) to the next in-sequence packet may be carried out by changing the value of the sub-head pointer and the value of the sub-tail pointer to match the value of the next in-sequence packet.

Figure 4:
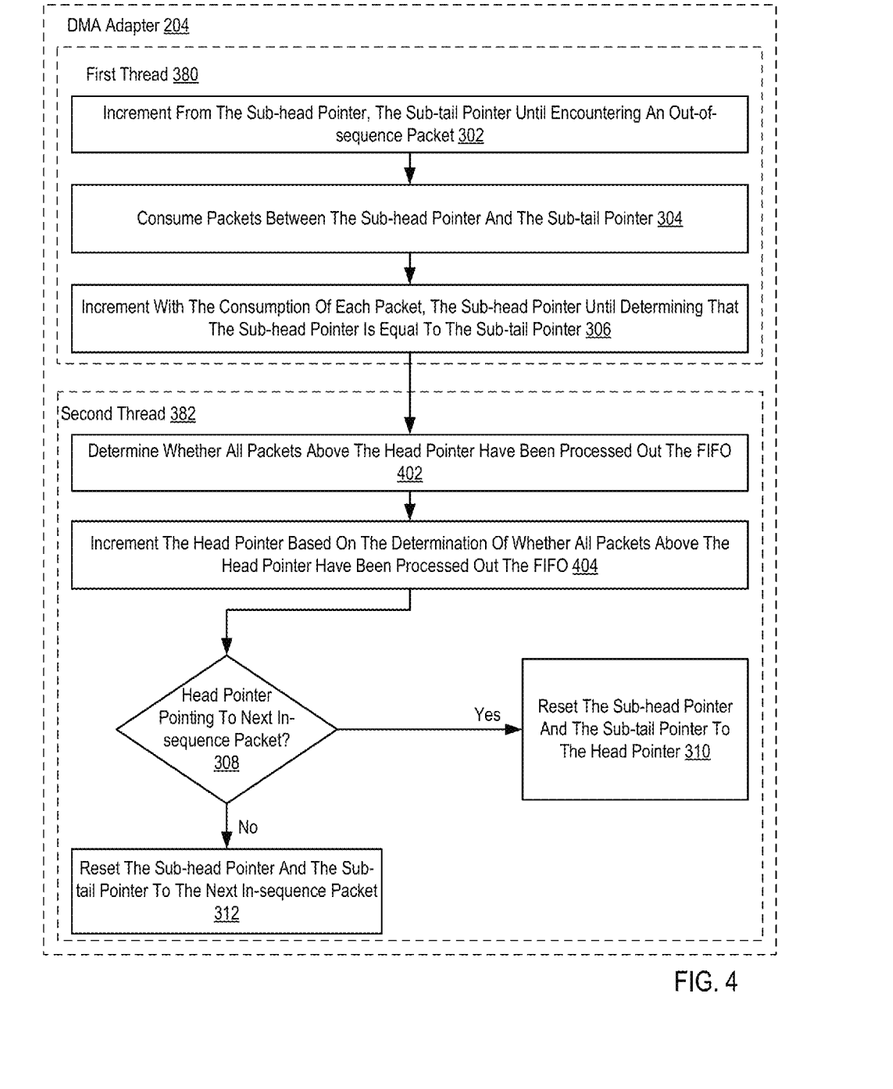
FIG. 4 sets forth a flow chart illustrating an example method of deterministic message processing in a direct memory access adapter according to embodiments of the present invention.

FIG. 4 sets forth a flow chart illustrating another example method of deterministic message processing in a direct memory access adapter according to embodiments of the present invention. The method of FIG. 4 is similar to the method of FIG. 3 in that the method of FIG. 4 also includes incrementing (302) from the sub-head pointer (299), the sub-tail pointer (298) until encountering an out-of-sequence packet; consuming (304) packets between the sub-head pointer (299) and the sub-tail pointer (298); incrementing (306) with the consumption of each packet, the sub-head pointer (299) until determining that the sub-head pointer (299) is equal to the sub-tail pointer (298); determining (308), in response to determining that the sub-head pointer (299) is equal to the sub-tail pointer (298), whether the head pointer (296) is pointing to the next in-sequence packet; if the head pointer (296) is pointing to the next in-sequence packet, resetting the sub-head pointer (299) and the sub-tail pointer (298) to the head pointer (296); and if the head pointer (296) is not pointing to the next in-sequence packet, the method of FIG. 4 includes the second thread (382) resetting the sub-head pointer (299) and the sub-tail pointer (298) to the next in-sequence packet.

The method of FIG. 4 also includes the second thread (382) determining (402) whether all packets above the head pointer (296) have been processed out of the FIFO message queue (262). Determining (402) whether all packets above the head pointer (296) have been processed out of the FIFO message queue (262) may be carried out by tracking which packets in the FIFO have been processed and determining if the packets beyond the head pointer have been processed. That is, the head pointer (296) identifies the space that is available for insertion of the newly received packets.

The method of FIG. 4 also includes the second thread (382) incrementing (404) the head pointer (296) based on the determination of whether all packets above the head pointer (296) have been processed out of the FIFO message queue (262). Incrementing (404) the head pointer (296) based on the determination of whether all packets above the head pointer (296) have been processed out of the FIFO message queue (262) may be carried out by changing the value of the head pointer.

Figure 5:
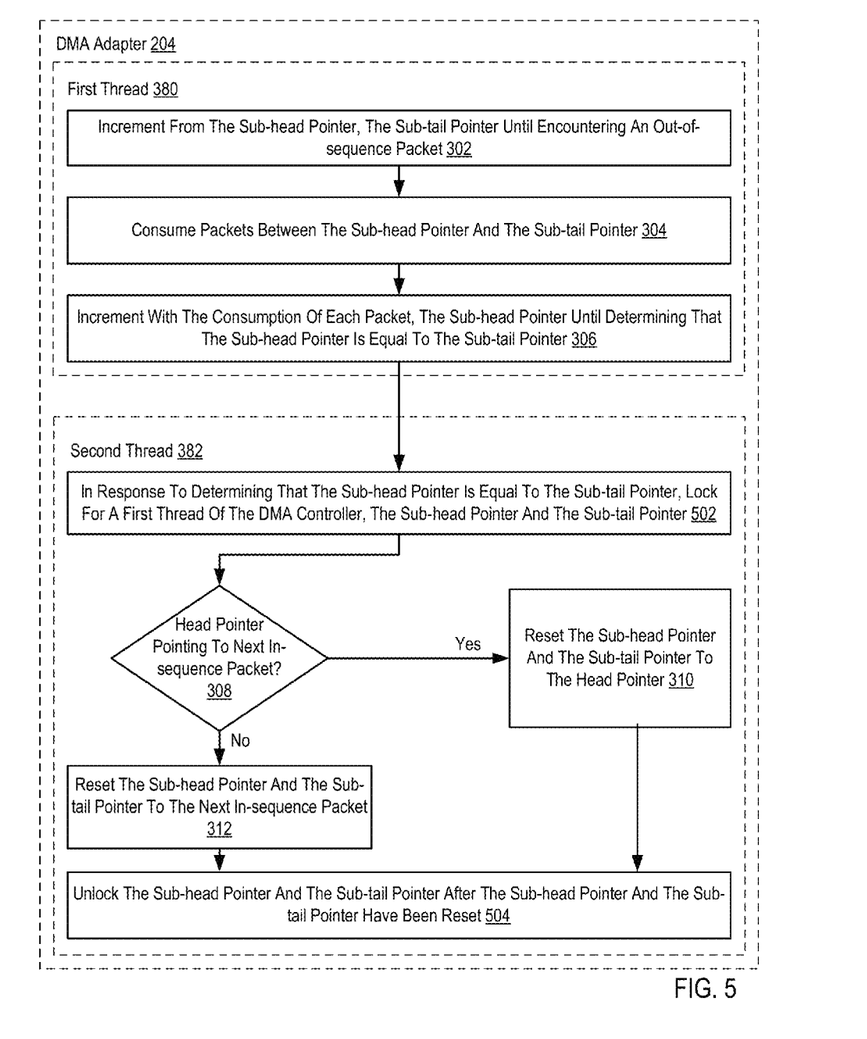
FIG. 5 sets forth a flow chart illustrating an example method of deterministic message processing in a direct memory access adapter according to embodiments of the present invention.

FIG. 5 sets forth a flow chart illustrating another example method of deterministic message processing in a direct memory access adapter according to embodiments of the present invention. The method of FIG. 5 is similar to the method of FIG. 3 in that the method of FIG. 5 also includes incrementing (302) from the sub-head pointer (299), the sub-tail pointer (298) until encountering an out-of-sequence packet; consuming (304) packets between the sub-head pointer (299) and the sub-tail pointer (298); incrementing (306) with the consumption of each packet, the sub-head pointer (299) until determining that the sub-head pointer (299) is equal to the sub-tail pointer (298); determining (308), in response to determining that the sub-head pointer (299) is equal to the sub-tail pointer (298), whether the head pointer (296) is pointing to the next in-sequence packet; if the head pointer (296) is pointing to the next in-sequence packet, resetting the sub-head pointer (299) and the sub-tail pointer (298) to the head pointer (296); and if the head pointer (296) is not pointing to the next in-sequence packet, the method of FIG. 3 includes the second thread (382) resetting the sub-head pointer (299) and the sub-tail pointer (298) to the next in-sequence packet.

The method of FIG. 5 includes the second thread (382) locking (502) for the first thread (380), in response to determining that the sub-head pointer (299) is equal to the sub-tail pointer (298), the sub-head pointer (299) and the sub-tail pointer (298). Locking (502) for the first thread (380), the sub-head pointer (299) and the sub-tail pointer (298) may be carried out by setting the value of the sub-head pointer that is available to the first thread; and setting the value of the sub-tail pointer that is available to the first thread.

The method of FIG. 5 also includes the second thread (382) unlocking (504) the sub-head pointer (299) and the sub-tail pointer (298) after the sub-head pointer (299) and the sub-tail pointer (298) have been reset. Unlocking (504) the sub-head pointer (299) and the sub-tail pointer (298) after the sub-head pointer (299) and the sub-tail pointer (298) have been reset may be carried out by allowing the first thread to read the new value of the sub-tail pointer and the new value of the sub-head pointer.

Figure 6:
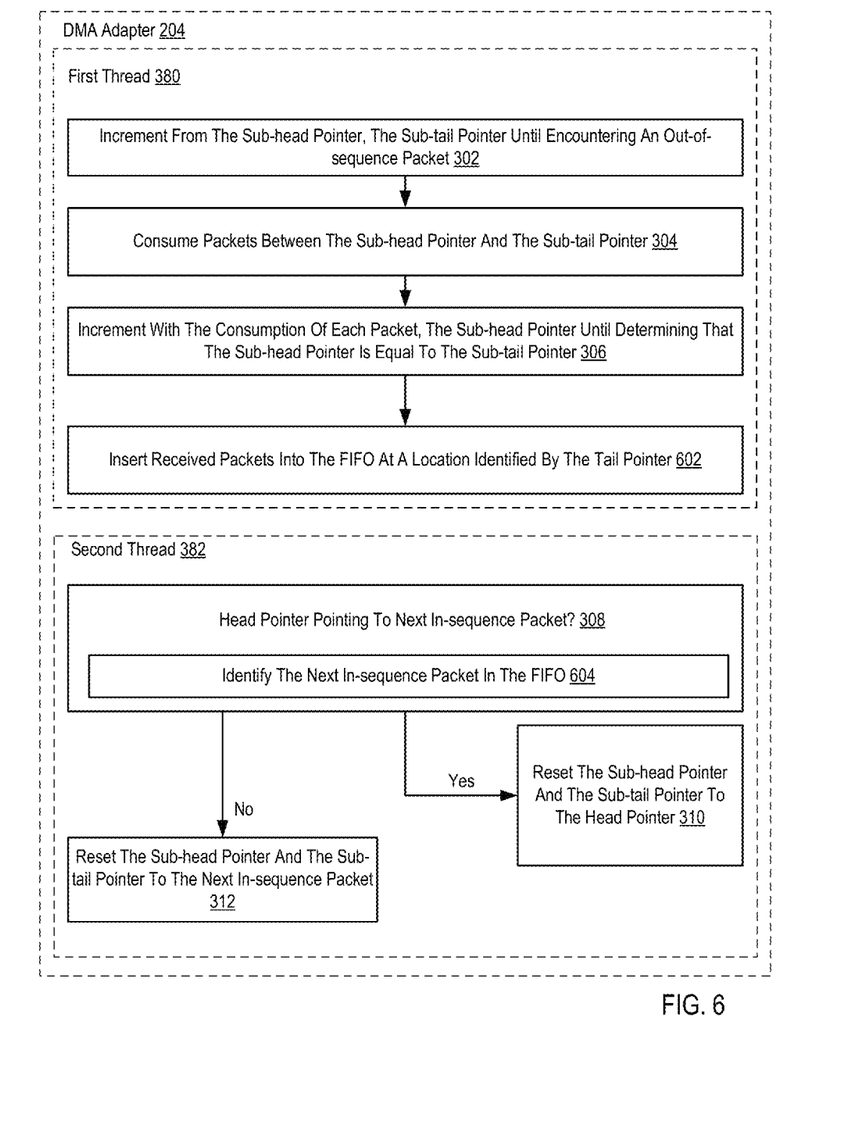
FIG. 6 sets forth a flow chart illustrating an example method of deterministic message processing in a direct memory access adapter according to embodiments of the present invention.

FIG. 6 sets forth a flow chart illustrating another example method of deterministic message processing in a direct memory access adapter according to embodiments of the present invention. The method of FIG. 6 is similar to the method of FIG. 3 in that the method of FIG. 6 also includes incrementing (302) from the sub-head pointer (299), the sub-tail pointer (298) until encountering an out-of-sequence packet; consuming (304) packets between the sub-head pointer (299) and the sub-tail pointer (298); incrementing (306) with the consumption of each packet, the sub-head pointer (299) until determining that the sub-head pointer (299) is equal to the sub-tail pointer (298); determining (308), in response to determining that the sub-head pointer (299) is equal to the sub-tail pointer (298), whether the head pointer (296) is pointing to the next in-sequence packet; if the head pointer (296) is pointing to the next in-sequence packet, resetting the sub-head pointer (299) and the sub-tail pointer (298) to the head pointer (296); and if the head pointer (296) is not pointing to the next in-sequence packet, the method of FIG. 3 includes the second thread (582) resetting the sub-head pointer (299) and the sub-tail pointer (298) to the next in-sequence packet.

The method of FIG. 6 includes the first thread (580) inserting (602) received packets into the FIFO message queue (262) at a location indicated by the tail pointer (297). Inserting (602) received packets into the FIFO message queue (262) at a location indicated by the tail pointer (297) may be carried out by moving one or more packets into the FIFO message queue.

In the method of FIG. 6, determining (308), in response to determining that the sub-head pointer (299) is equal to the sub-tail pointer (298), whether the head pointer (296) is pointing to the next in-sequence packet, includes identifying (604) the next in-sequence packet in the FIFO message queue (262). Identifying (604) the next in-sequence packet in the FIFO message queue (262) may be carried out by searching the FIFO for the next in-sequence packet in the FIFO message queue.

Example embodiments of the present invention are described largely in the context of fully functional computers that implements deterministic message processing in a direct memory access (DMA) adapter according to embodiments of the present invention. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by those of skill in the art, aspects of the present invention may be embodied as method, apparatus or system, or computer program product. Accordingly, aspects of the present invention may take the form of an entirely hardware embodiment or an embodiment combining software and hardware aspects (firmware, resident software, micro-code, microadapter-embedded code, and the like) that may all generally be referred to herein as a "circuit," "module," "system," or "apparatus." Furthermore, aspects of the present invention may take the form of a computer program product embodied in one or more computer readable media having computer readable program code embodied thereon.

Any combination of one or more computer readable media may be utilized. Such a computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described in this specification with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of computer apparatus, methods, and computer program products according to various embodiments of the present invention. In this regard, each block in a flowchart or block diagram may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for deterministic message processing in a direct memory access (DMA) adapter, the DMA adapter utilizing a first-in-first-out (FIFO) message queue for processing packets received by the DMA adapter, the DMA adapter using a head pointer, a tail pointer, a sub-head pointer, and a sub-tail pointer to point to particular packets within the FIFO message queue, the apparatus comprising a computer processor and a computer memory operatively coupled to the computer processor, the computer memory having disposed within it computer program instructions that, when executed by the computer processor, cause the apparatus to carry out the steps of:

incrementing from the sub-head pointer, the sub-tail pointer until encountering an out-of-sequence packet;
consuming packets between the sub-head pointer and the sub-tail pointer including incrementing with the consumption of each packet, the sub-head pointer until determining that the sub-head pointer is equal to the sub-tail pointer;
in response to determining that the sub-head pointer is equal to the sub-tail pointer, determining whether the head pointer is pointing to the next in-sequence packet;
if the head pointer is pointing to the next in-sequence packet, resetting the sub-head pointer and the sub-tail pointer to the head pointer; and
if the head pointer is not pointing to the next in-sequence packet, resetting the sub-head pointer and the sub-tail pointer to the next in-sequence packet.

2. The apparatus of claim 1 further comprising computer program instructions that, when executed by the computer processor, cause the apparatus to carry out the steps of:

determining whether all packets above the head pointer have been processed out of the FIFO message queue; and
incrementing the head pointer in response to determining that all packets above the head pointer have been processed out of the FIFO message queue.

3. The apparatus of claim 1 further comprising computer program instructions that, when executed by the computer processor, cause the apparatus to carry out the steps of:

in response to determining that the sub-head pointer is equal to the sub-tail pointer, locking for a first thread of the DMA adapter, by a second thread of the DMA adapter, the sub-head pointer and the sub-tail pointer; and
unlocking, by the second thread of the DMA adapter, the sub-head pointer and the sub-tail pointer after the sub-head pointer and the sub-tail pointer have been reset.

4. The apparatus of claim 1 wherein determining whether the head pointer is pointing to a next in-sequence packet includes identifying the next in-sequence packet in the FIFO message queue.

5. The apparatus of claim 1 further comprising computer program instructions that, when executed by the computer processor, cause the apparatus to carry out the steps of inserting received packets into the FIFO message queue at a location indicated by the tail pointer.

6. The apparatus of claim 1 wherein the sub-head pointer and the tail pointer are controlled by a first thread of the DMA adapter; wherein the head pointer and the sub-tail pointer are controlled by a second thread of the DMA adapter.

7. A computer program product deterministic message processing in a direct memory access (DMA) adapter, the DMA adapter utilizing a first-in-first-out (FIFO) message queue for processing packets received by the DMA adapter, the DMA adapter using a head pointer, a tail pointer, a sub-head pointer, and a sub-tail pointer to point to particular packets within the FIFO message queue, the computer program product disposed upon a non-transitory computer readable storage medium, the computer program product comprising computer program instructions that, when executed, cause a computer to carry out the steps of:

incrementing from the sub-head pointer, the sub-tail pointer until encountering an out-of-sequence packet;
consuming packets between the sub-head pointer and the sub-tail pointer including incrementing with the consumption of each packet, the sub-head pointer until determining that the sub-head pointer is equal to the sub-tail pointer;
in response to determining that the sub-head pointer is equal to the sub-tail pointer, determining whether the head pointer is pointing to the next in-sequence packet;
if the head pointer is pointing to the next in-sequence packet, resetting the sub-head pointer and the sub-tail pointer to the head pointer; and
if the head pointer is not pointing to the next in-sequence packet, resetting the sub-head pointer and the sub-tail pointer to the next in-sequence packet.

8. The computer program product of claim 7 further comprising computer program instructions that, when executed, cause a computer to carry out the steps of:

determining whether all packets above the head pointer have been processed out of the FIFO message queue; and
incrementing the head pointer in response to determining that all packets above the head pointer have been processed out of the FIFO message queue.

9. The computer program product of claim 7 further comprising computer program instructions that, when executed, cause a computer to carry out the steps of:

in response to determining that the sub-head pointer is equal to the sub-tail pointer, locking for a first thread of the DMA adapter, by a second thread of the DMA adapter, the sub-head pointer and the sub-tail pointer; and unlocking, by the second thread of the DMA adapter, the sub-head pointer and the sub-tail pointer after the sub-head pointer and the sub-tail pointer have been reset.

10. The computer program product of claim 7 wherein determining whether the head pointer is pointing to a next in-sequence packet includes identifying the next in-sequence packet in the FIFO message queue.

11. The computer program product of claim 7 further comprising computer program instructions that, when executed, cause a computer to carry out the steps of inserting received packets into the FIFO message queue at a location indicated by the tail pointer.

12. The computer program product of claim 7 wherein the sub-head pointer and the tail pointer are controlled by a first thread of the DMA adapter; wherein the head pointer and the sub-tail pointer are controlled by a second thread of the DMA adapter.

* * * * *